United States Patent [19]
Jankowitz et al.

[11] Patent Number: 5,875,236
[45] Date of Patent: Feb. 23, 1999

[54] CALL HANDLING METHOD FOR CREDIT AND FRAUD MANAGEMENT

[75] Inventors: Charles M. Jankowitz, Old Bridge, N.J.; Valentine C. Matula, Granville, Ohio; Gary A. Munson, Little Silver; Fang Wu, Middletown, both of N.J.

[73] Assignee: AT&T Corp, Middletown, N.J.

[21] Appl. No.: 562,229

[22] Filed: Nov. 21, 1995

[51] Int. Cl.⁶ .................................................. H04M 15/00
[52] U.S. Cl. .................. 379/114; 379/91.01; 379/93.02; 379/111; 379/112; 379/145
[58] Field of Search .................... 379/112, 113, 379/114, 115, 111, 143, 144, 145, 121, 126, 134, 128, 133, 137, 189, 196, 197, 207, 272, 229, 242, 243, 118, 120, 93.02, 93.04, 91.01, 91.02

[56] References Cited

U.S. PATENT DOCUMENTS

| | | | |
|---|---|---|---|
| 4,893,330 | 1/1990 | Franco | 379/115 |
| 5,463,681 | 10/1995 | Vaios et al. | 379/145 |
| 5,465,387 | 11/1995 | Mukherjee | 455/26.1 |
| 5,473,671 | 12/1995 | Partridge, III | 379/58 |
| 5,586,175 | 12/1996 | Hogan et al. | 379/112 |

FOREIGN PATENT DOCUMENTS

| | | | |
|---|---|---|---|
| 0 618 713 | 10/1994 | European Pat. Off. | H04M 3/22 |
| 0 653 868 | 5/1995 | European Pat. Off. | H04M 3/42 |
| WO 94/11959 | 5/1994 | WIPO | H04B 17/00 |
| WO 96/31043 | 10/1996 | WIPO | H04M 3/38 |

*Primary Examiner*—Curtis A. Kuntz
*Assistant Examiner*—Binh K. Tieu

[57] ABSTRACT

Prior to completing a telephone call, a database is accessed within a telecommunications network to determine whether the call should be completed. The billing number to which the call is to be charged is compared to a customer record assigned to the billing number and stored in the database. The customer record is checked against a treatment category code which combines geographic call restrictions and thresholding. A call may be identified as potentially fraudulent and blocked if the customer record associated with the billing number indicates that the account is in arrears. In addition, at predetermined intervals during the progress of the call and at the end of each allowed call to be charged to that billing number, the time and/or cost of each call is estimated and added to the total stored in a user-defined threshold counter in the database. When the total stored in the counter exceeds a predetermined threshold limit, a potentially fraudulent call is identified. In this manner, call authorization is performed on a per call basis to prevent fraudulent telephone calls.

31 Claims, 7 Drawing Sheets

PRIOR ART

| TREATMENT CATEGORY: 25 - MED RISK,LEC BILLED,OCP,MMHA,***MONITORING NPA's 214, 215, 305, 310, 404, 602, 703, 713, 717, 818, 904, FOR CC,BNS 1+INTL,1+DOM | | | | |
|---|---|---|---|---|
| *COUNTERS* | | | | |
| CALL TYPE | CC | BNS | 1+INTL | 1+DOM |
| NOT USED | | | | |
| INTL COLLECT | | X | | |
| DOM COLLECT | | X | | |
| INTL BT3 | | X | | |
| DOM BT3 | | X | | |
| INTL SENT PAID | | | X | |
| DOM SENT PAID | | | | X |
| INTL LEC CARD | X | | | |
| DOM LEC CARD | X | | | |
| INTL TOLL,INCL 900 | | | X | |
| DOM TOLL, NOT INCL 9 | | | | X |
| 1+900 (DOM TOLL 900) | | | | X |
| DOM COMM CREDIT CARD | | | | X |
| INTL COMM CREDIT CAR | | | X | |
| NOT USED | | | | |
| NOT USED | | | | |
| THRESHOLDS | $AMT  ACTION | $AMT  ACTION | $AMT  ACTION | $AMT  ACTION |
| 1 | $$$.$$   NA | $$$.$$   NA | $$$.$$   NA | $$$.$$   NA |
| 2 | $$$.$$   NF | $$$.$$   NF | $$$.$$   NF | $$$.$$   NF |
| 3 | $$$.$$   NF | $$$.$$   NF | $$$.$$   NF | $$$.$$   NF |
| 4 | $$$$.$$  NF | $$$.$$   NF | $$$$.$$  NF | $$$.$$   NF |
| 5 | $$$$.$$  NF | $$$$.$$  NF | $$$$.$$  NF | $$$$.$$  NF |
| ***** END OF REPORT ****** | | | | |

FIG. 6

| TREATMENT CATEGORY: 45 - NYNEX,HIGH-MEDIUM RISK FRAUD,OCP,MONITORIN g HIGH-MEDIUM RISK FRAUD,NPA's 718, 212, 917, 9 14 & 516 FOR BT3, COLLECT, 1+INTERNATIONAL & TOTAL. | | | | | | | | |
|---|---|---|---|---|---|---|---|---|
| *COUNTERS* | | | | | | | | |
| CALL TYPE | BT3 | | COL | | 1+INTL | | TOTAL | |
| NOT USED | | | | | | | | |
| INTL COLLECT | | | X | | | | X | |
| DOM COLLECT | | | X | | | | X | |
| INTL BT3 | X | | | | | | X | |
| DOM BT3 | X | | | | | | X | |
| INTL SENT PAID | | | | | X | | X | |
| DOM SENT PAID | | | | | | | X | |
| INTL LEC CARD | | | | | | | X | |
| DOM LEC CARD | | | | | | | X | |
| INTL TOLL,INCL 900 | | | | | X | | X | |
| DOM TOLL, NOT INCL 9 | | | | | | | X | |
| 1+900 (DOM TOLL 900) | | | | | | | X | |
| DOM COMM CREDIT CARD | | | | | | | X | |
| INTL COMM CREDIT CAR | | | | | X | | X | |
| NOT USED | | | | | | | | |
| NOT USED | | | | | | | | |
| THRESHOLDS | $AMT | ACTION | $AMT | ACTION | $AMT | ACTION | $AMT | ACTION |
| 1 | $$$.$$ | NA | $$$.$$ | NA | $$$.$$ | NA | $$$.$$ | NA |
| 2 | $$$.$$ | NF | $$$.$$ | NF | $$$.$$ | NF | $$$.$$ | NF |
| 3 | $$$.$$ | NF | $$$.$$ | NF | $$$.$$ | NF | $$$.$$ | NF |
| 4 | $$$$.$$ | NF | $$$.$$$ | NF | $$$.$$ | NF | $$$.$$$ | NF |
| 5 | $$$$.$$ | NF | $$$$.$$ | NF | $$$$.$$ | NF | $$$$.$$ | NF |
| ***** END OF REPORT ****** | | | | | | | | |

CALL HANDLING METHOD FOR CREDIT AND FRAUD MANAGEMENT

BACKGROUND OF THE INVENTION

1. Field of the Invention

The present invention relates generally to the field of telecommunications, and more particularly to an automated system for detecting and preventing fraudulent telephone calls in a telecommunications network.

2. Description of the Related Art

Fraudulent telephone activity for domestic and international calls presents a significant and increasing problem to carriers of telecommunications networks, such as the assignee of the present invention, AT&T Corporation. Such fraudulent activity may include calling card fraud and/or subscriber fraud.

Calling card fraud involves the misappropriation of a valid calling card number and then using the misappropriated number to place toll calls which are billed to an unsuspecting subscriber.

Subscriber fraud involves fraudulent usage by an otherwise legitimate subscriber. Typically, this type of fraudulent activity occurs when a subscriber signs up for telecommunications services and proceeds to use the services with no intent to ever pay for the services provided. Such a fraudulent/delinquent subscriber would continue to use the services without paying until the network access was blocked by the service provider. Subscriber fraud may also occur through the subscriber's illegal call forwarding, illegal third party number billing schemes, illegal collect schemes, etc.

Conventional telecommunications systems today, such as what is known as the public switched telephone network (PSTN), comprise several interdependent networks: the local or exchange area network, which is typically operated by a local telephone company or local exchange company (LEC); and the toll network, which is operated by a long distance or interexchange carrier (IXC) such as AT&T Corporation.

In the conventional PSTN, a given telephone within a LEC network is capable of accessing the IXC network through known gateway switching equipment, such as AT&T's 4ESS™ and 5ESS™ toll switches and operator services position system (OSPS™) switch. Upon access to the IXC network, a toll call may be completed outside the LEC network. However, because the LEC's typically perform credit and collection processes on the IXC's behalf under contracts between the IXC and the LEC's, it has become increasingly difficult for the IXC to detect and prevent fraudulent telephone calls within the IXC network.

Prior attempts to detect and prevent such fraudulent telephone calls have been made, but with generally unsatisfactory results. For instance, because the LEC's are responsible for billing most customers utilizing the IXC's toll services, the LEC would provide customers who were delinquent in paying their bills with a predetermined grace period prior to suspending the delinquent customer's access to the IXC network for domestic and international long distance service. As a result, the IXC would continue to incur high revenue losses as a result of the delinquent customer's continued use of long distance services during this grace period until access to such service was suspended by the LEC.

To combat this type of subscriber fraud, the IXC has previously attempted to block switch-accessed toll calls (international or domestic) at the originating/access 4ESS™ switch (e.g., 1+/011+calls) by creating one or more Network Call Denial (NCD) databases containing billing numbers for customers known to be delinquent in payment to the IXC. Such billing numbers include the number from which the call is placed (ANI), the number to whom the call is directed for collect calls, the third party number when the call is billed to that third party, and calling card numbers issued by the IXC.

Figure 1:
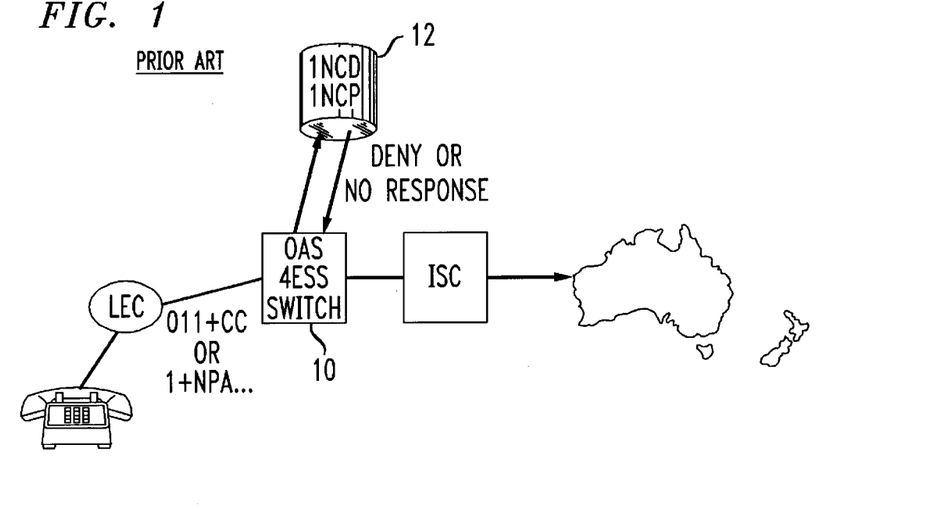
FIG. 1 is a schematic illustrating a prior art communication architecture for detecting fraud prior to call set-up.

As illustrated in FIG. 1, when specified call types (i.e., 1+calls) are introduced into the IXC network, the 4ESS™ switch [10] launches a query to a NCD database [12] (in parallel with the call processing) through a common channel signalling network (CCS7 network), such as AT&T's 2STP™ network. The NCD database [12] is then searched to determine if the billing number matches that of a delinquent customer stored in the database [12]. When a match is found, a response is transmitted back to the 4ESS™ switch [10] to identify and terminate the call. Thus, the IXC was able to block calls within its network for customers who are delinquent in payment when the billing number matches that of a previously known delinquent customer stored in the NCD database [10].

Figure 2:
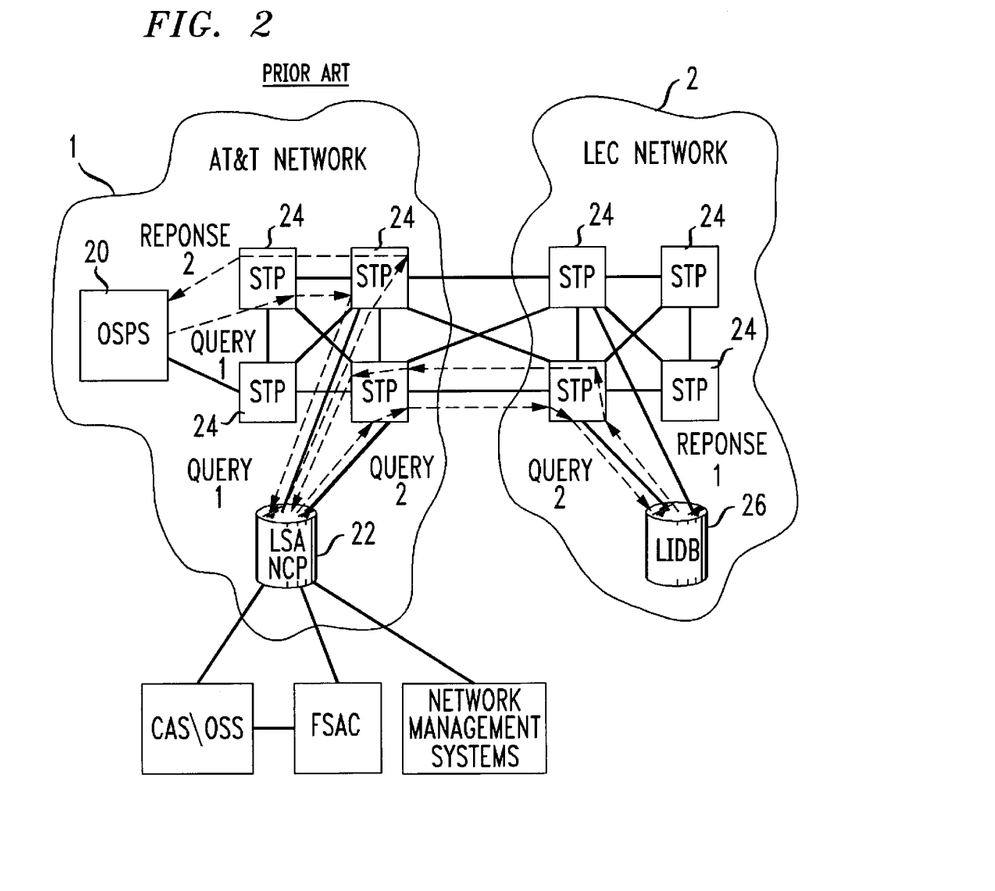
FIG. 2 is a schematic illustrating a second prior art communication architecture for detecting fraud prior to call set-up.

However, the above-described NCD database [10] proved ineffective in detecting and preventing fraudulent credit card calls for credit cards issued by the LEC (LEC cards). In an attempt to prevent such fraudulent credit card calls, the IXC must access the line information database (LIDB) of the LEC in order to validate the credit card before the call is completed in the IXC network, as illustrated in FIG. 2.

In operation, when a LEC credit card call is placed by a customer, the call is processed in the IXC network [1] by an OSPS™ switch [20] which receives the LEC card number as the billing vehicle. The OSPS™ switch [20] thereafter launches an appropriate query [Query 1] through the CCS7 network [24] (such as AT&T's 2STP™ network) to a line service application/network control point (LSA/NCP) [22] within the IXC network [1]. Upon receipt of the query [Query 1], the LSA/NCP [22] checks a "hot list" (a.k.a. deactivation list) stored in the LSA/NCP [22] for that particular LEC card number and associated personal identification number (PIN). If the LEC card number and associated PIN match a card number and PIN contained in the "hot list", the LSA/NCP [22] sends a deny response through the CCS7 network [24] back to the OSPS™ switch [20], which in turn prevents completion of the call.

If the LEC card number and associated PIN do not match any numbers and PIN's stored in the LSA/NCP "hot list", then the LSA/NCP [22] was required to send a subsequent query [Query 2] through the CCS7 network [24] to the LIDB [26] in the LEC network [2] for "true" validation by the LEC. The LIDB [26] in the LEC network [2] contains a list of valid credit card numbers and PIN's issued by that particular LEC, as well as a list of LEC credit card numbers that should be denied due to unauthorized/fraudulent usage and/or delinquent payment.

Should the LEC card number and associated PIN transmitted in the second query [Query 2] fail to match one of the valid numbers stored in the LIDB [26] of the LEC network [2] (invalid LEC card number and/or PIN), then the LIDB [26] returns a first response [Response 1] to the LSA/NCP [22] to deny the call and the LSA/NCP passes the "deny" response [Response 2] to the OSPS™ switch [20] to prevent completion of the call.

In contrast, however, should the LEC card number and associated PIN transmitted in the second query [Query 2]

match one of the valid numbers stored in the LIDB [26], then the LIDB [26] returns a response [Response 1] to the LSA/NCP [22] to allow the call and the LSA/NCP [22] passes the "allow" response (Response 2) to the OSPS™ switch [20] to allow the call. The LSA/NCP [22] also stores the LEC card number and PIN in a fraud tracking list, and increments the card usage by one each time a call is made that is to be charged to that particular LEC card number. If the usage count for a particular LEC card number and PIN exceeds a predetermined threshold in a given time period (velocity), then the LSA/NCP [22] will identify that particular LEC card number and PIN combination as potentially fraudulent.

While the above-described LSA/NCP application has met with moderate success in preventing fraudulent calls billed to LEC cards by validating the cards and monitoring the frequency of calls in a given period of time (velocity), such application has several drawbacks. First, to validate the LEC card, the IXC must communicate outside the IXC network with the LIDB [26]. In addition, unscrupulous callers seeking to perpetrate fraudulent calls are becoming more and more sophisticated. As such, these fraudulent callers have learned to recognize the velocity threshold levels set by the IXC and continue to go undetected by maintaining their fraudulent calls below the velocity threshold levels. In this manner, these fraudulent callers adjust their fraudulent calling patterns to go undetected by placing smaller numbers of fraudulent calls (below the velocity threshold) and instead hold each fraudulent call for longer (and more expensive) durations.

Figure 3:
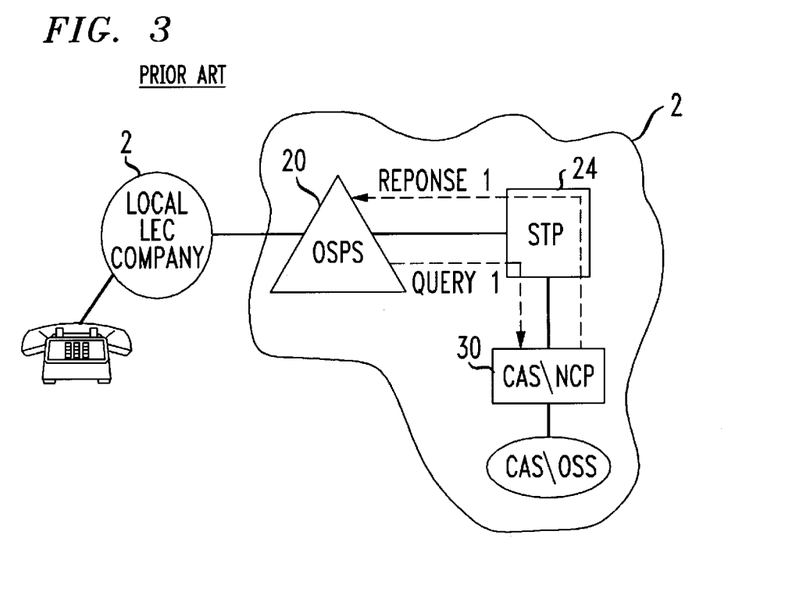
FIG. 3 is a schematic illustrating a third prior art communication architecture for detecting fraud prior to call set-up.

To prevent fraudulent calls charged to credit cards issued by the IXC (IXC cards), the IXC has also previously utilized a customer account services/network control point (CAS/NCP) [30] in the IXC network [2] which contains information concerning the IXC cardholder. Referring to FIG. 3, when an IXC credit card call is received from the LEC network [2] by an OSPS™ switch [20], the OSPS™ switch [20] sends a query [Query 1] to the CAS/NCP [30] through the CCS7 network [24] to validate the call. Like the LIDB [26] described above and illustrated in FIG. 2, the CAS/NCP [30] checks the IXC card number and PIN to ascertain its validity by comparing the IXC card number and PIN to those stored in a database within the CAS/NCP [30]. If the card number and PIN match and the account is in good standing, the CAS/NCP [30] sends a response [Response 1] back to the OSPS™ switch [20] to allow the call.

In addition, like the LIDB [26], the CAS/NCP [30] may increment the card usage by one each time a call is made that is to be charged to that particular IXC card number and store the usage count in its database. If the usage count for a particular IXC card number exceeds a predetermined threshold in a given time period (velocity)—which threshold is also stored in the database of the CAS/NCP [30]—then the CAS/NCP [30] will identify that particular IXC card number as potentially fraudulent.

Alternatively, if the card number and/or PIN do not match those stored in the CAS/NCP database, the account is overdue, or the velocity threshold is exceeded, then the CAS/NCP [30] may take appropriate action, such as terminating the call attempt or allowing the call but notifying the appropriate work center of the IXC for customer follow-up.

Additionally, credit limits could be placed on particular IXC card numbers stored in the database of the CAS/NCP [30]. When the initial query [Query 1] is transmitted to the CAS/NCP [30] by the OSPS™ switch [20], the CAS/NCP [30] can also verify that the credit amount for the particular IXC card is not exceeded. If the credit amount is not exceeded, the CAS/NCP [30] may instruct the OSPS™ switch [20] in its response [Response 1] to allow the call. Periodically, an adjunct in communication to the OSPS™ switch [20] may determine the actual cost of the IXC card call to that point in time and may transmit that information to the CAS/NCP [30] through the CCS7 network [24] whereupon the CAS/NCP [30] will deduct that amount from the IXC card's credit and store the new amount in the database. When the credit amount is exhausted, the CAS/NCP [30] may instruct the OSPS™ switch [20] via the CCS7 network [24] to terminate the call in progress or to take some further action, such as having an operator access the call to request another form of payment.

While the CAS/NCP [30] has been successfully used by the IXC, its use is limited to IXC card calls. Accordingly, the CAS/NCP [30] is not capable of detecting potentially fraudulent calls utilizing billing methods other than an IXC issued credit card.

SUMMARY OF INVENTION

The above and other problems of the prior art are solved by the present invention which provides a system on a single platform for detecting and handling fraudulent telephone calls in a telecommunications network without adversely affecting call set-up. In accordance with the present invention, the system comprises one or more databases within the network containing customer records. The system processes information received from a switch in the network, such as the billing number to be charged for the call. When the record associated with the billing number is located in the database, the system further processes certain user-defined conditions including whether the account is in arrears and/or whether specific calling features (domestic, international, collect, bill to third party, LEC calling card, specific destination numbers, country codes or city codes, area codes/exchanges, etc.) are satisfied.

If any of these conditions are satisfied, the system may instruct the switch to block the call. The term "block" or "blocking" as used herein is not intended to be limited simply to the denial of a call. Instead, the term may be user defined to include, for example, denial of the call, redirecting the call to a fraud/credit management center, or offering the caller an alternative billing method.

Alternatively, if none of the user-defined conditions are satisfied, the system may instruct the switch to allow the call and to signal the system at the end of the call. On predetermined intervals during the progress of the call, the system measures the time of the call and estimates the cost of the call by applying the measured time to rate tables stored in the database.

Based upon a user-defined treatment category assigned to the customer record and stored in the database, the system adds the cost of the call to the total cost stored in a threshold counter identified by the treatment category and corresponding to the type of call. When the total cost stored in the threshold counter exceeds a predetermined threshold limit, the system identifies the call as potentially fraudulent and may take further user-defined investigatory action including interrupting the call in progress or automatic denial of subsequent calls.

BRIEF DESCRIPTION OF THE DRAWINGS

The foregoing features and other aspects of the invention are explained in the following description taken in connection with the accompanying drawings wherein.

DESCRIPTION OF THE PREFERRED EMBODIMENTS

Figure 4:
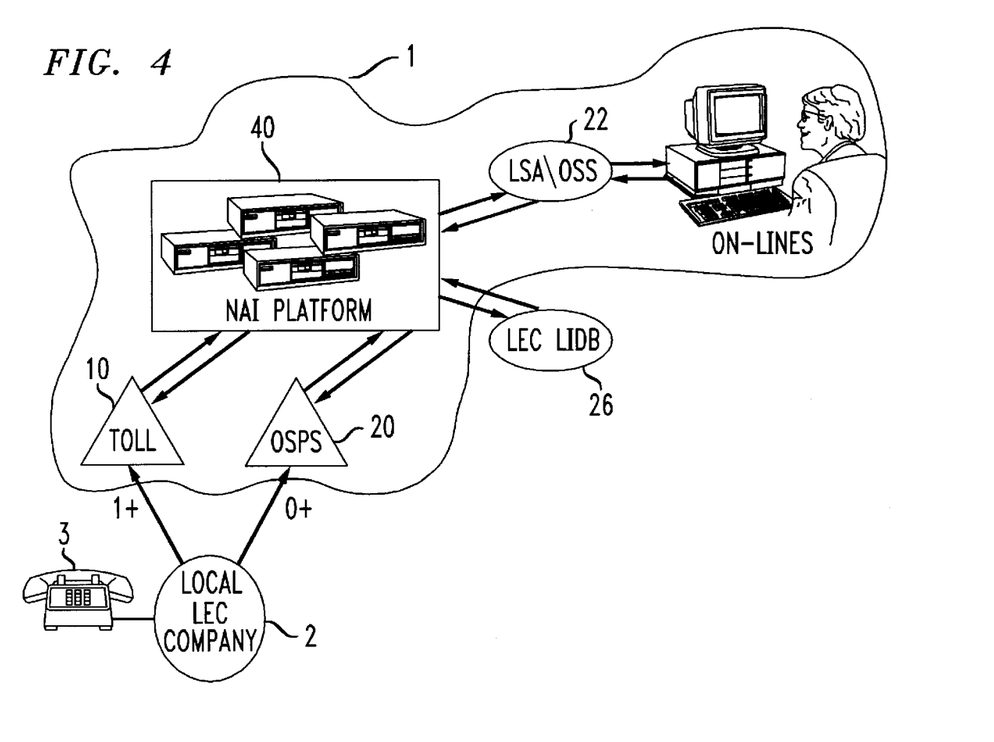
FIG. 4 is a schematic illustrating the NAI communication architecture of the present invention.

Referring to FIG. 4, when an individual attempts to place a toll telephone call from telephone [3], that call is routed within the LEC network [2] and connected to the IXC network [1] in a conventional manner. Typically, when the call is a direct dialed toll call (1+call) to be billed to the ANI of the calling party, the call accesses the IXC network [1] in a conventional manner at a known toll originating switch [10], such as AT&T's 4ESS™ or 5ESS™ toll switches. When the call is to be billed to some other billing vehicle (0+call) (i.e., third party call, collect call, LEC card call or other commercial credit card call), the call typically accesses the IXC network [1] in a conventional manner at a known gateway switch [20] such as AT&T's OSPS™ switch.

Irrespective of whether the call is a 1+ or 0+call, the present invention is capable of processing the call on a single platform to determine whether the call is potentially fraudulent without adversely impacting call set-up time. This fraud detection is accomplished by providing a system operating on a single platform in the IXC network [1], which system is referred to hereinafter as "Network Access Interruption" (NAI) and denoted by reference numeral [40].

The NAI [40] comprises one or more multiprocessor computers within the IXC network [1]. The NAI [40] also includes at least one database containing information for certain customer accounts. The NAI database includes a Customer Account Table containing all line numbers (ANI, Mobile Identification Number (MIN), 10 digit card number, or dialed number) that are to receive NAI treatment, including those customers who are to be denied credit or for whom selective blocking and/or thresholding are to be provided.

Figure 5:
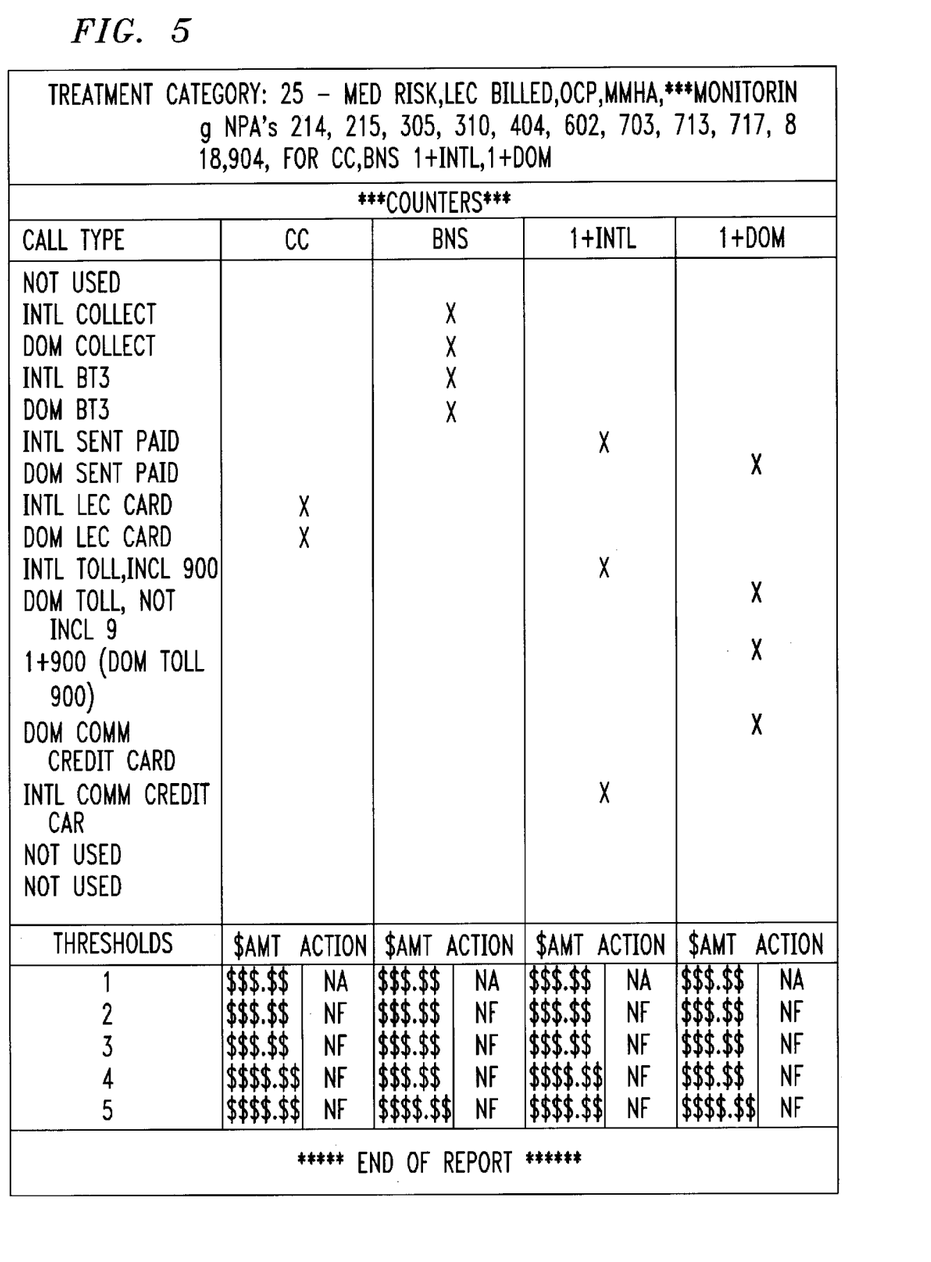
FIGS. 5 and 6 are tables illustrating examples of various thresholds which are monitored by the NAI platform of the present invention.
Figure 6:
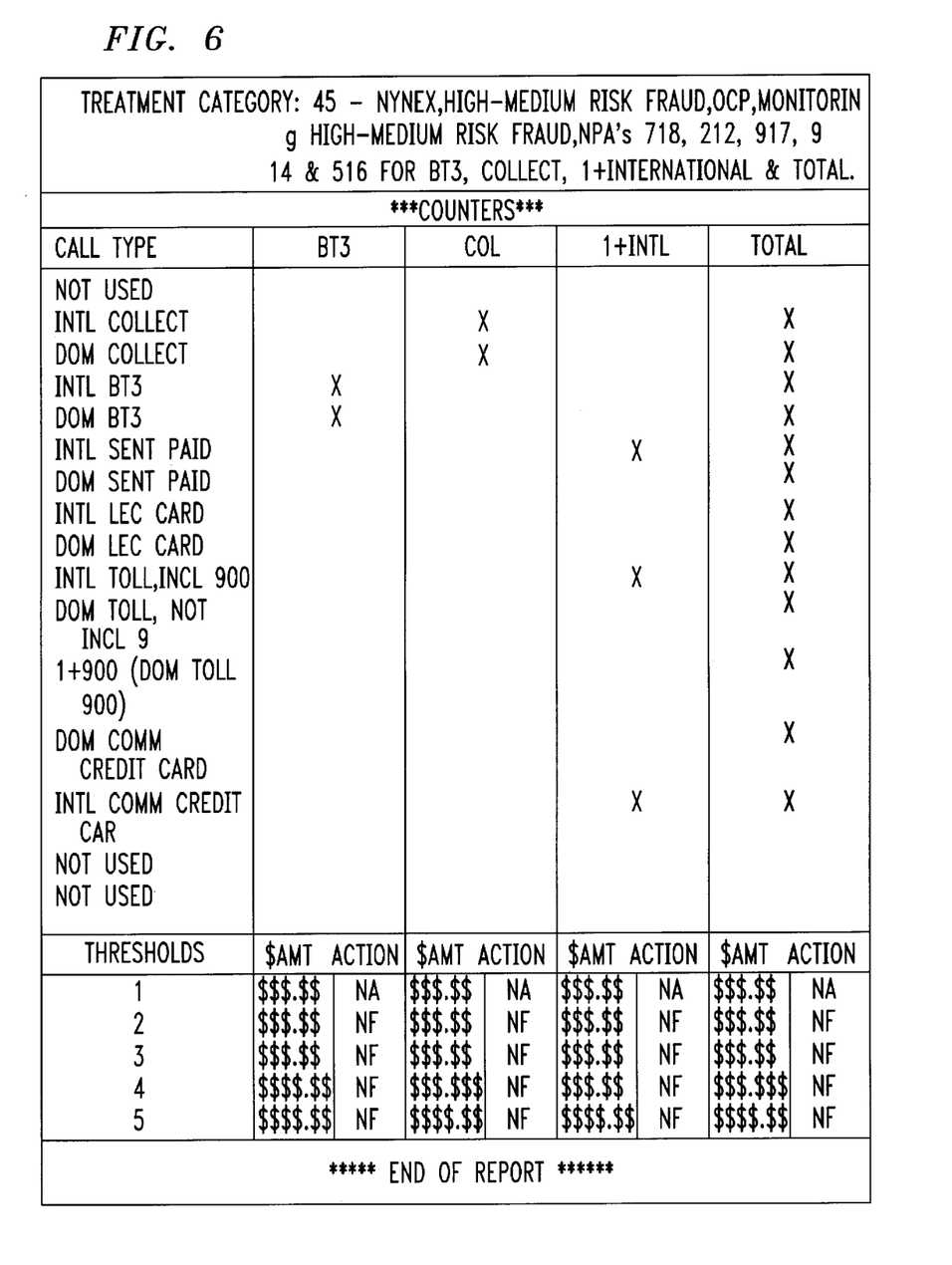

In addition, the Customer Account Table stored in the NAI database may also include, but is not limited to, the following information about each of the above-mentioned customer accounts:

- a Credit Deny Indicator to identify a customer having delinquent credit.
- a Collect Call Indicator to indicate whether a collect call to a particular customer should be denied or a query sent to the LIDB [26].
- a Third Number Indicator to indicate whether a bill to third call should be denied or a query sent to the LIDB [26].
- a 900 Call Indicator to indicate whether a 900+call should be allowed or denied.
- an International Call Indicator to indicate whether an international call should be allowed or denied.
- a Treatment Category Number which identifies the record in the Treatment Category Table defining the type of blocking and/or thresholding for the particular customer.
- four threshold counters or buckets, each of which are associated with a threshold type specified in the Treatment Category Table. These threshold counters store the total amount of dollars and cents or minutes that have accumulated against their associated threshold types. Preferably, as illustrated in FIGS. 5–6, the threshold types allow for combinations of the following types of calls:
  1. International Collect
  2. Domestic Collect
  3. International Bill to Third
  4. Domestic Bill to Third
  5. International Sent Paid
  6. Domestic Sent Paid
  7. International LEC Card
  8. Domestic LEC Card
  9. International Toll, including 900
  10. Domestic Toll, not including 900
  11. Domestic Toll 900 (1+900)
  12. Domestic Commercial Credit Card
  13. International Commercial Credit Card
  14. Specific Destination Thresholding
  15. Dollar vs. Minute-of-Use Thresholding
  16. IntraLATA Collect
  17. In traLATA Sent Paid
  18. IntraLATA LEC Card
  19. IntraLATA Toll
  20. IntraLATA Commercial Credit Card
- four threshold call counters, each of which is associated with a threshold type specified in the Treatment Category Table. These threshold call counters track the total number of calls that have accumulated against their associated threshold type.

preferably, five threshold levels per threshold type.

Furthermore, the following information may also be stored in a database of the NAI [40]:

- a Card Deactivation Table which stores all card (LEC or commercial) numbers and PIN combinations to be denied service by the IXC.
- a Blocked Dialed Telephone Number Table which identifies domestic and international destination telephone numbers to which all call s are to be blocked/denied, regardless of caller and access method.
- a Selective Blocking Category which identifies destination country and city codes, world zone and area code/exchanges, which are to be allowed and/or blocked.
- a Domestic Rate Table which contains the rates for domestic calls.
- an International Rate Table which contains the rates for international calls.

While any number of customers may be maintained in the Customer Account Table in the NAI database, it may be preferable that only delinquent customers, high risk customers, repetitive delinquent customers, and new customers be maintained in the Customer Account Table. In this manner, thresholding may be implemented for new customers for a brief period (such as three to nine months) to verify that the customer timely pays its bills. If the customer's account is not delinquent at the end of this initial period, then that particular customer may be removed from the Customer Account Table. In contrast, if the particular customer's account has been delinquent, that customer's record status may be changed to credit denied, treatment categories may be modified to allow less usage before alerts are generated, or monitoring may be modified to monitor on a shorter period of time (i.e., weekly rather than monthly).

Figure 7A:
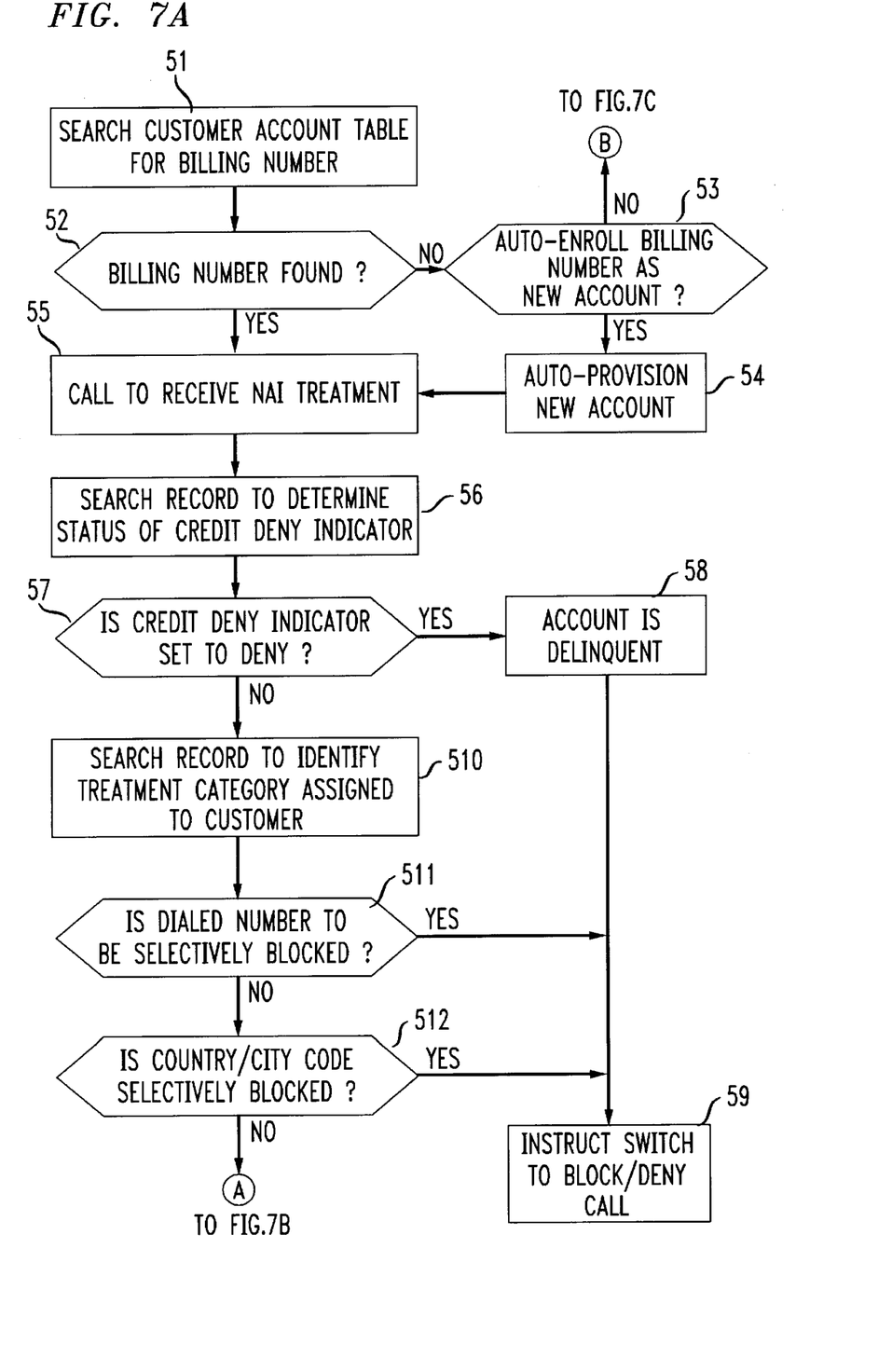
FIGS. 7A–7C are block diagrams illustrating the steps for processing a call in accordance with the present invention.
Figure 7B:
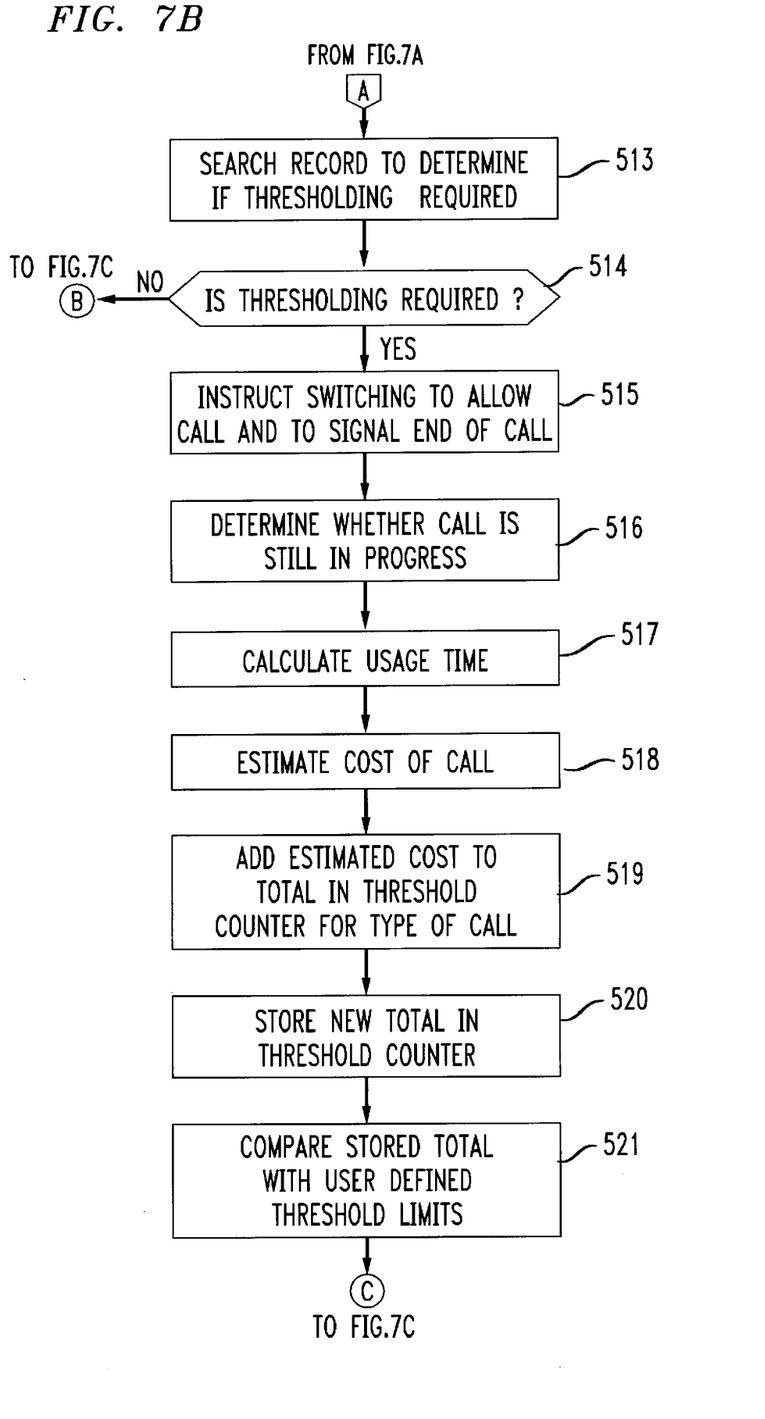
Figure 7C:
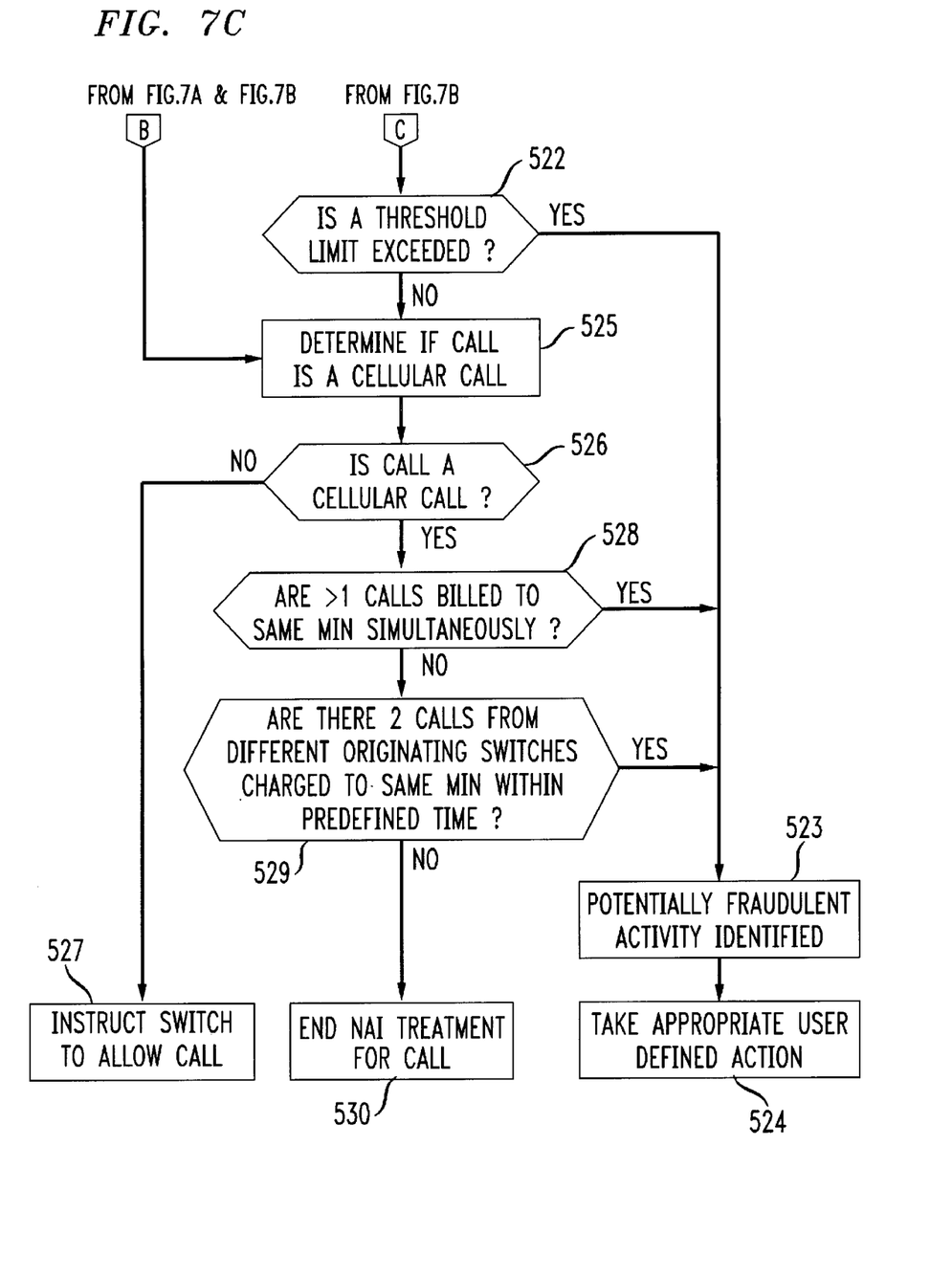

Referring to FIGS. 7A–7C, when a call is received by the IXC originating switch [10, 20] in the IXC network [1], the switch [10, 20] sends a query via a conventional CCS7 signalling network (such as AT&T's 2STP™ network) to the NAI [40], which may be in parallel with continuing to set up the call. For 1+toll calls, the billing number (the ANI of the calling party) is transmitted to the NAI [40] along with the query from the switch [10]. For 0+calls, the billing number (LEC or commercial card, bill to third party number, etc.) is transmitted to the NAI [40] along with the query from the switch [20]. Other information may also be sent to the NAI [40], including the destination number, whether the call is a cellular call, or whether the caller is a subscribed customer of the IXC.

The NAI [40] processes the query to first determine whether that particular billing number is to receive NAI treatment. The NAI [40] searches the Customer Account Table stored in its database to determine if the record associated with the billing number is stored therein (step S1). If the billing number (or possibly the destination number) does not match a record corresponding to the billing number in the Customer Account Table (step S2), then the NAI [40] may transmit a response to the switch [10, 20] via the CCS7 signalling network to allow/complete the call (step S27). However, if the billing number matches a record stored in the Customer Account Table (step S2), then the call is to receive NAI treatment (step S5).

Alternatively, if there is no customer record in the Customer Account Table associated with the billing number (step S2), the NAI [40] may automatically create a customer record for the caller's ANI depending upon various user-defined decision criteria (step S3). For instance, when the caller's ANI does not correspond to any ANI associated with a customer of the IXC (non-IXC customer), then a customer record for that particular ANI may be automatically created and stored in the Customer Account Table of the NAI database (step S4). The NAI [40] may identify such non-IXC customers based upon information contained in the Carrier Selection Information parameter of the SS7 Network Interconnect ISUP (ISDN User Part) Initial Address Message (IAM). Furthermore, any time that an international call is made which exceeds a predetermined criteria (such as time or cost), the ANI associated with that international call may be automatically enrolled in the Customer Account Table stored in the NAI database [40] (e.g., a customer record is created and stored for that particular ANI).

For those customers (billing numbers) which are to receive NAI treatment—i.e., billing number matches a record stored in the Customer Account Table and/or an account is automatically enrolled in the Customer Account Table—the NAI [40] next determines whether the account associated with the particular billing number is delinquent. To determine whether an account is delinquent, the NAI [40] searches the record associated with the particular billing number in the Customer Account Table of the NAI database to determine the status of the credit deny indicator for the particular account (step S6). If the particular account is delinquent, the credit deny indicator in the record will be set by an operator to "deny" (steps S7 & S8) and the NAI [40] transmits a deny response back to the switch [10, 20] via the CCS7 signalling network to terminate the call or to take other appropriate action such as interrupting the call and transmitting a voice message to the customer that the account is overdue or redirecting the call to an appropriate work center of the IXC (step S9). However, if the credit deny indicator is not set to "deny" (step S7), then the NAI [40] continues to process the query.

For billing numbers other than LEC cards, the NAI [40] continues to process the call as discussed in the next paragraph. However, for calls to be billed to LEC cards, the NAI [40] validates the LEC card number and PIN by transmitting a query to LIDB [26] in the LEC network [2] via the CCS7 signalling network in a manner similar to that discussed earlier with respect to the LSA [22]. If the LEC card number or PIN are invalid or delinquent, the LIDB [26] will transmit a response back to the NAI [40] via the CCS7 signalling network to deny the call and the NAI [40] will instruct the switch [20] accordingly. However, if the LEC card number and PIN are validated by the LIDB [26], the LIDB will transmit an "allow" response back to the NAI [40] via the CCS7 signalling network and the NAI [40] will continue to process the call.

For those billing numbers other than LEC cards and for LEC cards validated by the LIDB [26], the NAI [40] next searches the record associated with the particular billing number to identify the Treatment Category Code for this particular account which is stored in the record (step S10). The Treatment Category Code defines the type of blocking and/or thresholding for the particular customer and may be assigned on a per customer basis according to the customer's individual characteristics, such as credit score, region of the country, calling plan, entity responsible for billing, etc.

Based upon the specific Treatment Category Code for the customer, the IXC may selectively block calls that are to be charged to that billing number. For instance, the IXC may geographically restrict a customer's ability to place an international or domestic call from a particular billing number to a specific telephone number or to a country or city to which fraudulent calls are known to be made by setting a deny indicator for that particular destination number (step S11) or to that particular country or city code (step S12). In this manner, the NAI [40] is able to search the record associated with the particular billing number to determine if that specific destination number, country code or city code is set to "deny." If so, then the NAI [40] transmits a deny response back to the switch [10, 20] via the CCS7 signalling network to block the call or to take other appropriate action (step S9). Otherwise, if the indicator for the destination number, country code or city code is not set to "deny," then the NAI [40] continues to process the query.

In continuing to process the query, the NAI [40] again searches the record for the particular billing number to determine if the call is to receive thresholding (step S13). In each record stored in the Customer Account Table of the NAI database is a Call Treatment Category Code which defines, among other things, the type of thresholding assigned for the particular customer. This thresholding is user defined and it is not intended that the examples discussed herein limit in any way the use of other parameters known in the art for monitoring telephone patterns to detect fraudulent calls.

For instance, referring to the table illustrated in FIG. 5, there is shown a Treatment Category assigned to a medium risk customer. This Treatment Category defines which call types are to included in each of the four threshold counters or buckets. For the Treatment Category assigned to the medium risk customer illustrated in FIG. 5, for instance, the first threshold counter (as indicated by the presence or absence of an "X" beneath the threshold counter) is defined for calling cards (CC) and is set to accumulate and store the total amount of dollars and cents or minutes charged to international and domestic LEC cards (INTL LEC CARD and DOM LEC CARD).

The second threshold counter illustrated in FIG. 5 is defined for billed number screening (BNS) and is set to accumulate and store the total amount of dollars and cents or minutes charged to international collect (INTL COLLECT), domestic collect (DOM COLLECT), international bill to third party (INTL BT3) and domestic bill to third party (DOM BT3) calls.

The third threshold counter illustrated in FIG. 5 is defined for direct dialed international toll calls (1+INTL) and is set to accumulate and store the total amount of dollars or minutes charged to international sent paid (INTL SENT PAID), international toll calls including 1+900 numbers (INTL TOLL, INCL 900) and international commercial credit card (INTL COMM CREDIT CAR) calls.

Finally, the fourth threshold counter illustrated in FIG. 5 is defined for direct dialed domestic toll calls (1+DOM) and is set to accumulate and store the total amount of dollars or minutes charged to domestic sent paid (DOM SENT PAID), domestic toll calls not including 1+900 numbers (DOM TOLL, NOT INCL 9), domestic 1+900 toll calls (DOM TOLL 900) and domestic commercial credit card (DOM COMM CREDIT CARD) calls.

To further illustrate the flexibility of NAI [40], an example of a Call Treatment Category which might be assigned to a high risk account is illustrated in FIG. 6. The call types are similar to those illustrated in FIG. 5, but the four user defined counters are defined to accumulate and store the amount of dollars or minutes charged to bill to third party (BT3), collect (COL), international (1+INTL), and the total of all calls (TOTAL), respectively.

Based upon the record stored in the Customer Account Table of the NAI database, the NAI [40] is capable of determining whether a call is to be denied/blocked or allowed with thresholding. If a call having thresholding assigned to the account is to be allowed (step S14), the NAI [40] sends a response back to the appropriate switch [10, 20] through the CCS7 signalling network to allow the call (step S15). On predetermined intervals during the progress of the call, the NAI [40] sends a query through the CCS7 signalling network to the switch [10, 20] to determine whether the call is still in progress and the switch transmits a signal back to the NAI [40] back through the CCS7 signalling network an appropriate response (step S16). If the call is still in progress, the NAI [40] calculates the usage or billable time in minutes of call duration (which corresponds approximately to the time elapsed since the NAI's transmission of the allow response) (step S17). The NAI [40] stores the total usage time in the threshold counter or bucket corresponding to the type of call (as defined by the Call Treatment Category). This usage time is added to the amount previously stored in that threshold counter and the new total is stored in the threshold counter.

This process continues and repeats steps 16–20 while the call is in progress until such time as the call is terminated. Upon termination of the call by the customer, the switch [10, 20] transmits an end-of-call signal to the NAI [40] through the CCS7 signalling network and the NAI [40] updates the total stored in the threshold counter up to the time the call was terminated.

Alternatively, the NAI [40] may calculate the estimated cost of the particular call by multiplying the measured usage time by the applicable rates contained in the Domestic and International Rate Tables stored in the database of the NAI [40] (step S18). The NAI [40] stores the total estimated cost in the threshold counter corresponding to the type of call (as defined by the Call Treatment Category). When the cost of a particular call is estimated by the NAI [40], that cost is added to the amount previously stored in that threshold counter and the new total is stored in the threshold counter (steps S19 and S20).

For each user defined threshold counter, the customer's assigned treatment category also defines at least one threshold level to alert the NAI [40] and the IXC when the particular customer has exceeded the user defined threshold. Preferably, more than one threshold limit may be defined for each threshold counter. Therefore, irrespective of whether the NAI [40] stores usage time (minutes) or the estimated cost of the call (dollars and cents) in the threshold counters, the NAI [40] compares the total (minutes or dollars) to the predefined threshold limits for the particular threshold counter (step S21). When a threshold limit is exceeded (step 122), the NAI [40] identifies the customer as a potentially fraudulent caller (step S23) and takes certain precautionary/investigatory actions, such as denial of the call, interrupting the call in progress, or redirecting the call to an appropriate work center of the IXC (step S24). As such, the NAI [40] may monitor a specific customer's calling patterns on a real time basis to determine if the customer's telephone usage is indicative of potentially fraudulent activity.

The NAI [40] may also be provided with a velocity threshold counter which would store the total number of calls charged to a particular billing number in a predetermined period of time. Each time a call is made within that predetermined period of time that is to be charged to a particular billing number, the NAI [40] increments the velocity threshold counter by one and stores the new total in the velocity threshold counter. When the total stored in the velocity threshold counter exceeds a predefined threshold limit indicative of fraudulent activity, the NAI [40] identifies the customer (billing number) as a potentially fraudulent caller and may take additional user-defined investigatory actions.

In addition to the above-described thresholding function, the NAI [40] is also able to detect potentially fraudulent calls billed to a cellular telephone number. Since cellular telephone calls are readily identifiable based upon the billing number (MIN) and/or Original Line Identification (OLI) information transmitted to the NAI [40] in the initial query from the IXC switch [10, 20], the NAI [40] is able to determine whether the call is made from a cellular telephone (step S25).

For cellular calls (step S26), the NAI [40] further checks whether there is another call in progress from that billing number (MIN) to determine whether more than one call is being billed simultaneously to the same billing number (MIN) (step S28). Since only one call may be charged to a cellular billing number (MIN) at a given time, the NAI [40] has identified potentially fraudulent activity (step S23) and takes certain user-defined precautionary or investigatory actions when more than one cellular call is simultaneously billed to the same billing number (MIN) (step S24).

Additionally, the NAI [40] is able to monitor the time and originating switches from which a cellular call is placed. When more than one cellular call is charged to the same billing number (MIN) in a relatively short period of time (step S29), each of which is from different originating switches (indicating potentially different geographic locations), the NAI [40] again has identified potentially fraudulent activity (step S23) and may take certain user-defined precautionary or investigatory actions (step S24).

Although illustrative preferred embodiments have been described herein in detail, it should be noted and will be appreciated by those skilled in the art that numerous variations may be made within the scope of this invention without departing from the principle of this invention and without sacrificing its chief advantages. The terms and expressions have been used herein as terms of description and not terms of limitation. There is no intention to use the terms or expressions to exclude any equivalents of features shown and described or portions thereof and this invention should be defined in accordance with the claims which follow.

We claim:

1. A method for identifying whether a telephone call to be billed to a billing number in a telecommunications network is potentially fraudulent, comprising the steps of:
   (a) searching for said billing number in a network access interruption database;
   (b) selectively enrolling said billing number in said network access interruption database if said billing number was not found in said searching step;
   (c) accumulating a cost, if any, of prior calls charged to said billing number;
   (d) measuring the cost of said call;
   (e) adding said cost of said call to said cost of prior calls to form an accumulated cost;
   (f) comparing said accumulated cost with a predetermined cost threshold limit; and
   (g) identifying said call as potentially fraudulent when said accumulated cost exceeds said predetermined threshold limit.

2. The method according to claim 1, wherein said selectively enrolling step further comprises:
   selectively enrolling said billing number if said billing number is not found in a customer account services database, and
   wherein said measurement and comparison steps occur while said call is in progress or at the termination of said call.

3. The method according to claim 2, further comprising the steps of:
   (a) estimating the cost of said call based upon a measured duration;
   (b) comparing said estimated cost with a predetermined cost threshold limit; and
   (c) identifying said call as potentially fraudulent when said estimated cost exceeds said predetermined cost threshold limit.

4. The method according to claim 3, wherein the cost of said call is estimated and compared with said threshold limits while the call is in progress or at the termination of said call.

5. The method according to claim 4, further comprising the steps of:
   (a) storing a total estimated cost in a threshold counter of said network access interruption database;
   (b) calculating a new total estimated cost by adding said estimated cost to said total estimated cost stored in said threshold counter and storing said new total estimated cost in said threshold counter;
   (c) comparing said new total estimated cost stored in said threshold counter with a predetermined threshold limit; and
   (d) identifying said call as potentially fraudulent when said new total estimated cost stored in said threshold counter exceeds said predetermined threshold limit.

6. The method according to claim 5, further comprising the steps of:
   (a) receiving a query including a billing number from a switch within the telecommunications network responsible for processing the call;
   (b) determining one of a variety of types of calls based upon said query;
   (c) searching said network access interruption database of customer records for a customer record associated with said billing number; and
   (d) identifying a threshold counter in said customer record for storing the new total estimated cost of calls associated with said call type charged to said billing number.

7. The method according to claim 3, wherein the duration of said call is measured up to the point in time of receiving a signal from a switch within the telecommunications network responsible for processing the call.

8. The method according to claim 7, wherein the signal from the switch is transmitted at predetermined intervals while the call is in progress.

9. The method according to claim 7, wherein the signal from the switch is transmitted at the end of the call.

10. The method according to claim 4, wherein the step of estimating the cost of said call comprises the step of applying the measured duration of said call to a rate table stored in said network access interruption database.

11. The method according to claim 10, further comprising the steps of:
    (a) identifying the day of the week and time of day of said call; and
    (b) estimating the cost of said call by applying the measured duration of said call to said rate table, wherein said rate table comprises the cost per minute for each hour of the day and each day of the week.

12. The method according to claim 10, further comprising the steps of:
    (a) determining whether said call is a domestic or an international call based upon a destination number dialed;
    (b) estimating the cost of domestic calls by applying the measured duration of said call to a domestic rate table stored in said network access interruption database; and
    (c) estimating the cost of international calls by applying the measured duration of said call to an international rate table stored in said network access interruption database.

13. The method according to claim 6, further comprising the steps of:
    (a) searching said customer record associated with said billing number assigned to a customer's account to determine if said customer's account is delinquent; and
    (b) identifying said call as potentially fraudulent when said customer record indicates that said account is delinquent.

14. The method according to claim 13, further comprising the step of transmitting a response to said switch to block said call when said customer record indicates that said account is delinquent.

15. The method according to claim 6, further comprising the steps of:
    (a) searching said customer record associated with said billing number to determine whether said call type is authorized; and
    (b) transmitting a response to said switch to block said call when said customer record indicates that said call type is not authorized.

16. The method according to claim 6, further comprising the steps of:
   (a) receiving a destination number to which said call is to be completed;
   (b) searching said customer record associated with said billing number to determine whether said destination number is authorized; and
   (c) transmitting a response to said switch to block said call when said customer record indicates that said destination number is not authorized.

17. The method according to claim 6, further comprising the steps of:
   (a) receiving a destination number comprising a country code and a city code to which said call is to be completed;
   (b) searching said customer record associated with said billing number to determine whether calls to said country code and said city code is authorized; and
   (c) transmitting a response to said switch to block said call when said customer record indicates that calls to said country code and said city code are not authorized.

18. The method according to claim 6, further comprising the steps of:
   (a) identifying the call as a cellular telephone call;
   (b) monitoring said network to determine whether another cellular telephone call is being charged to said billing number at the same time as said identified cellular call; and
   (c) identifying said identified cellular call and said another cellular telephone call as potentially fraudulent when both are charged to the same billing number at the same time.

19. The method according to claim 6, further comprising the steps of:
   (a) identifying the call as a cellular telephone call;
   (b) identifying the originating switch based upon the received query;
   (c) maintaining in said network access interruption database previous cellular telephone calls charged to said billing number including the time and identified originating switch for each of said previous cellular calls;
   (d) comparing said identified originating switch for said identified cellular call with said originating switches for said previous cellular calls stored in said network access interruption database; and
   (e) identifying said identified cellular call as potentially fraudulent when, within a predetermined period of time, said originating switches for said previous cellular calls are different from said identified originating switch for said identified cellular call.

20. The method according to claim 6, further comprising the steps of:
   (a) maintaining a velocity threshold counter associated with said billing number in said network access interruption database;
   (b) storing the total number of calls charged to said billing number within a predetermined period of time in said velocity threshold counter;
   (c) incrementing said stored total number of calls by one each time a call is charge to said billing number and storing said incremented total in said velocity threshold counter;
   (d) comparing said incremented total stored in said velocity threshold counter with a predetermined threshold limit; and
   (h) identifying said call as potentially fraudulent when said incremented total stored in said velocity threshold counter exceeds said predetermined threshold limit.

21. The method according to claim 6, wherein said billing number is a number from which the call is being placed.

22. The method according to claim 6, wherein said billing number is a credit card number.

23. The method according to claim 6, wherein said billing number is a bill to third party number.

24. The method according to claim 6, wherein said billing number is a destination number.

25. The method according to claim 6, wherein said billing number is a mobile identification number.

26. The method according to claim 6, further comprising the step of transmitting a response to said switch to allow the call when no customer record stored within said network access interruption database corresponds to said billing number.

27. The method according to claim 6, further comprising the step of automatically creating a customer record associated with said billing number and storing said created customer record in said network access interruption database when certain user-defined decision criteria are satisfied.

28. The method according to claim 27, wherein said user-defined decision criteria comprises a call having a billing number that does not correspond to a customer of a service provider of said telecommunications network.

29. The method according to claim 28, further comprising the step of identifying whether the billing number is associated with a customer of said service provider based upon information contained in an initial address message received by said switch.

30. A system for identifying a telephone call within a telecommunications network as potentially fraudulent, comprising:
   (a) a switch for receiving said call in said network;
   (b) a processor for identifying the call as potentially fraudulent;
   (c) means for connecting said switch to said processor to enable said processor and switch to communicate with each other, said switch transmitting a query including a billing number associated with said call to said processor;
   (d) a network access interruption database connected to said processor, said network access interruption database comprising a table of customer records, each customer record being associated with a different billing number and each customer record comprising a user-defined call treatment category;
   said processor searching for said billing number in said network access interruption database;
   said processor selectively enrolling said billing number in said network access interruption database if said billing number was not found in said searching step;
   (e) a threshold counter stored in said network access interruption database for each customer record, said threshold counter capable of storing the total estimated cost of one or more types of calls charged to the billing number associated with the customer record while the call is in progress, wherein said one or more types of calls to be stored in said threshold counter being defined by said call treatment category; and
   (f) a predetermined threshold limit stored in said network access interruption database for each threshold counter, said threshold limit being defined by said call treatment category and said call being identified as potentially fraudulent when said total estimated cost stored in said threshold counter exceeds said predetermined threshold limit.

31. An apparatus for use in conjunction with a telecommunications network to identify a telephone call as potentially fraudulent, comprising:

(a) a processor in communication with a switch within said network, said processor adapted to receive a billing number associated with said call from said switch and further adapted to instruct said switch whether or not to complete said call;

(b) a network access interruption database connected to said processor, said network access interruption database comprising a table of customer records, each customer record being associated with a different billing number and each customer record comprising a user-defined call treatment category;

said processor searching for said billing number in said network access interruption database;

said processor selectively enrolling said billing number in said network access interruption database if said billing number was not found in said searching step;

(c) a threshold counter stored in said network access interruption database for each customer record, said threshold counter adapted to store the total estimated cost of one or more types of calls charged to the billing number associated with the customer record while the call is in progress, wherein said one or more types of calls to be stored in said threshold counter being defined by said call treatment category; and (f) a predetermined threshold limit stored in said network access interruption database for each threshold counter, said threshold limit being defined by said call treatment category and said call being identified as potentially fraudulent when said total estimated cost stored in said threshold counter exceeds said predetermined threshold limit.

* * * * *